United States Patent [19]

McDonald et al.

[11] Patent Number: 4,615,428
[45] Date of Patent: Oct. 7, 1986

[54] HIGH SPEED ARTICLE ORIENTING AND FEEDING APPARATUS

[75] Inventors: Walter McDonald, Landing; Norbert F. Seitel, Gillette, both of N.J.

[73] Assignee: Norwalt Design, Inc., Whippany, N.J.

[21] Appl. No.: 641,510

[22] Filed: Aug. 16, 1984

[51] Int. Cl.⁴ .............................................. B65G 47/24
[52] U.S. Cl. .................................................... 198/399
[58] Field of Search ............... 198/377, 379, 400, 384, 198/399, 951; 221/162, 172

[56] References Cited

U.S. PATENT DOCUMENTS

| | | | |
|---|---|---|---|
| 2,818,964 | 1/1985 | Picard et al. | 198/397 X |
| 3,722,659 | 3/1973 | Aidlin et al. | 198/400 |
| 4,091,600 | 5/1978 | Itoh | 198/400 X |
| 4,394,933 | 7/1983 | Ackley | 198/397 X |
| 4,556,072 | 12/1985 | Horie et al. | 198/951 X |

Primary Examiner—Joseph E. Valenza
Assistant Examiner—Michael Stone
Attorney, Agent, or Firm—Stefan J. Klauber

[57] ABSTRACT

Apparatus is provided for accepting a population of articles of the type having one axis generally longer than the other and one end different from the other with random orientation of the ends and providing a high-speed output stream of articles with all the ends thereof commonly oriented. The apparatus comprise a rotatable wheel adapted to accept the articles with randomly oriented ends in the periphery thereof and advance said articles to an output station having means for constraining the articles during advance thereof in the wheel and means for biasing said articles to turn end for end within the wheel only as the result of an article being in an undesired endwise orientation.

13 Claims, 8 Drawing Figures

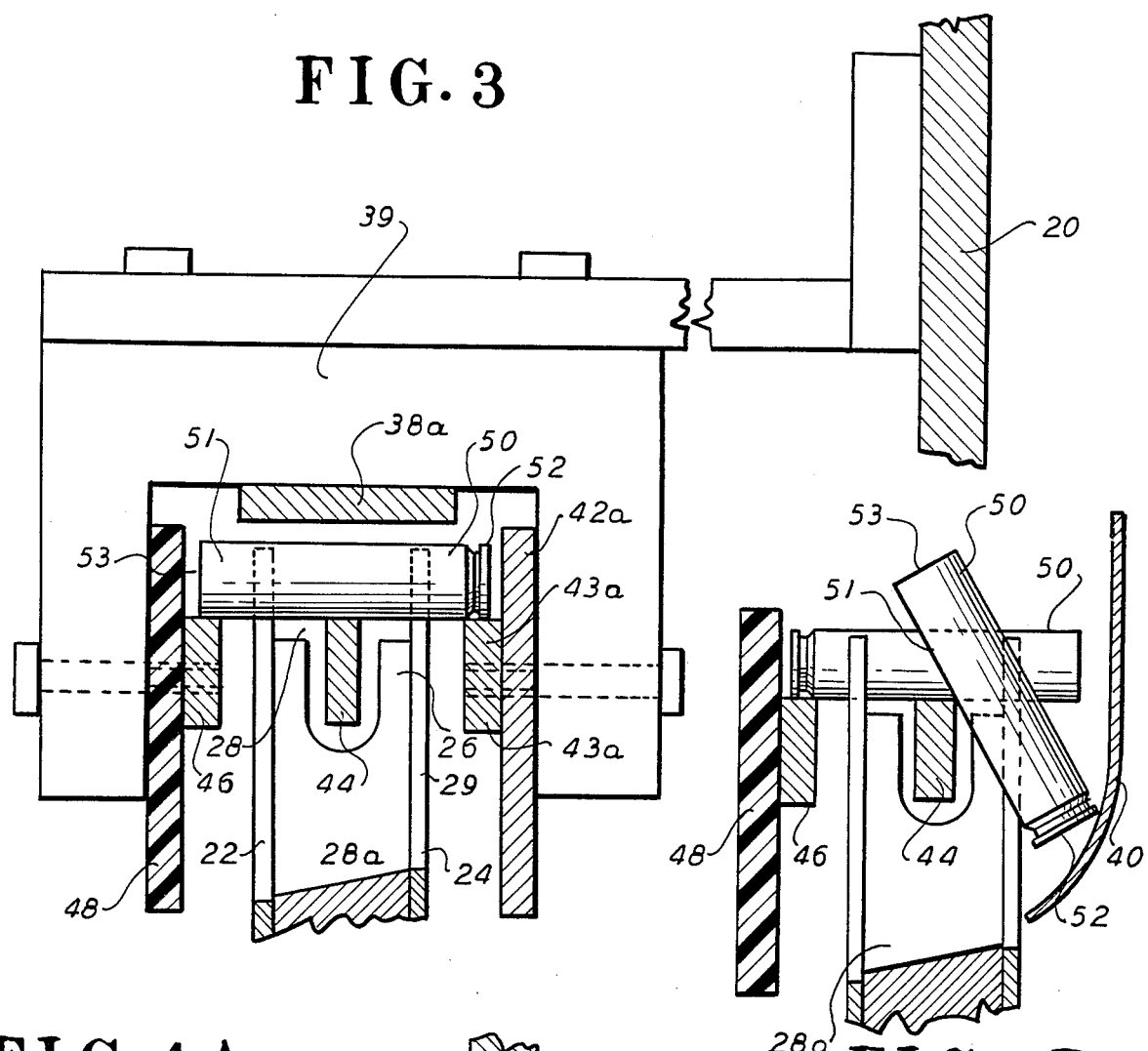
FIG. 3
FIG. 4B
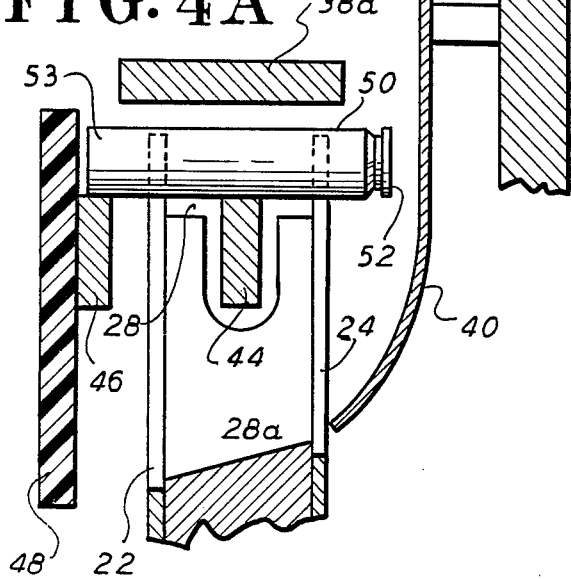
FIG. 4A
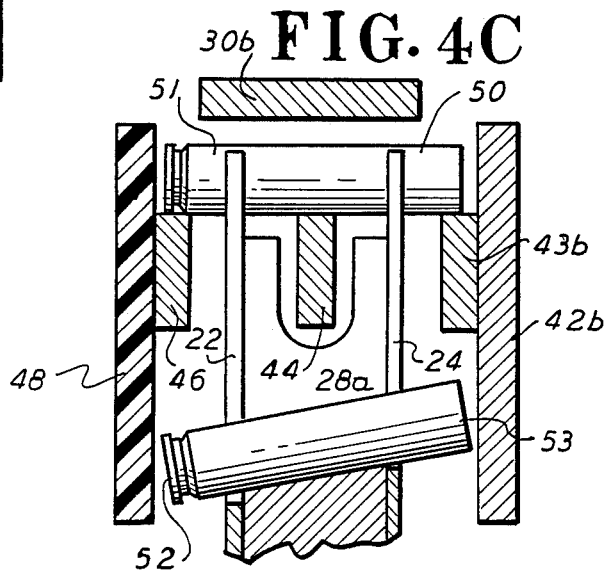
FIG. 4C

HIGH SPEED ARTICLE ORIENTING AND FEEDING APPARATUS

FIELD OF THE INVENTION

This invention relates to article orienting or feeding apparatus and, more particularly, to apparatus for accepting an initially presented population of articles having one axis that is longer than the other axis and one end different than the other and providing a high-speed output stream wherein the principal axis and like ends of all the articles are commonly oriented.

BACKGROUND OF THE INVENTION

In numerous applications of processing apparatus, including for use in the packaging industry and the like, it is necessary to orient objects in a common direction, or to change the direction of orientation of objects to a new common direction and feed same as a high-speed stream for further mechanical manipulation and/or use.

The configuration of the articles being fed and the attitude at which they are to be oriented determine the design of the orienting arrngements. Frequently, intricate and complicated arrangements of gates, cams, guides and other orienting mechanisms are required. These mechanical arrangements may be difficult and expensive to fabricate, arrange in the system, and maintain properly adjusted. In addition, they are frequently prone to jamming in the event that a non-standard or defective article is inadvertently introduced into the feed system or the feed is irregular in timing. Even apparently simple items such as, for example, hollow cylinders, cup-shaped articles and the like, are frequently not conducive to the design of uncomplicated mechanical devices for performing the orientation or re-orientation.

In accordance with the foregoing, it may be regarded as an object of the present invention to provide apparatus capable of orienting, ordering, and rapidly feeding a population of articles having one axis longer than the other axis of cylindrical, rectangular and the like shape and having one end different from the other, which is adjoined to a feed system for said articles wherein the ends thereof are in random orientation, to yield an output stream wherein like ends of all such articles are commonly oriented with their principal axis parallel, thereby facilitating further manipulation and/or processing of said objects.

A further object of the invention is to provide apparatus for feeding articles of the type having one axis longer than the other and one substantially weighted end from a collection having the weighted end randomly oriented to yield an output stream in a common endwise oriented position.

Another object of the invention is to provide apparatus for feeding articles of the type having one axis longer than the other and a substantially closed weighted end from a collection having the closed end randomly oriented to yield an output stream in a common oriented endwise position.

Still another object of this invention is to provide apparatus for feeding articles of the type having one axis longer than the other and one end of a substantially different diameter or size than the other end from a collection having the ends randomly oriented to yield an output stream in a common oriented endwise position.

SUMMARY OF THE INVENTION

In accordance with the present invention, apparatus is provided for accepting an initially presented population of articles of the type having one axis generally longer than the other and one end different than the other including cylinders, tubes, bottles and the like in random orientation of the ends, and providing a high-speed output stream, for further use or mechanical manipulation, wherein the ends and principal axis of all said articles are commonly oriented.

The apparatus of the invention includes a rotatable wheel having means in the periphery thereof for accepting articles with the principal axis thereof oriented parallel in a horizontal plane and transverse to the direction of rotation of said wheel and with the ends thereof randomly oriented.

Means are arranged along the track of rotation of said wheel for constraining the articles within the periphery thereof to assure their advance to an output zone for said wheel with their principal axis parallel and in a horizontal plane.

Also included are means for biasing an article in said wheel to turn it end for end within the periphery thereof along the track of rotation of said wheel intermediate said article accepting station and said article output station which includes means associated with said biasing means to actuate the same only as a result of the article being in an undesired endwise orientation.

It has been found that the orienting apparatus of the invention can automatically and effectively reorient the ends of articles having one axis generally longer than the other which are fed with the ends thereof randomly oriented and surprising and unexpectedly provide a high-speed output stream wherein the ends and principal axis of all said articles are commonly oriented.

BRIEF DESCRIPTION OF THE DRAWINGS

In the drawings:

FIG. 3 is an enlarged cross-sectional view, part broken away, taken through line 3—3 in FIG. 1.

FIG. 4A is an enlarged fragmentary end elevation view, in section, illustrating the first stage of the orientation operation of the article orienting wheel of the apparatus of FIG. 1.

FIG. 4B is an enlarged fragmentary end elevation view, in section, illustrating the state of orientation when an article will drop generally downwardly to orient the end thereof.

FIG. 4C is an enlarged fragmentary end elevation view, in section, illustrating the state of orientation in which the reoriented article is desposited.

DESCRIPTION OF A PREFERRED EMBODIMENT

Figure 1:
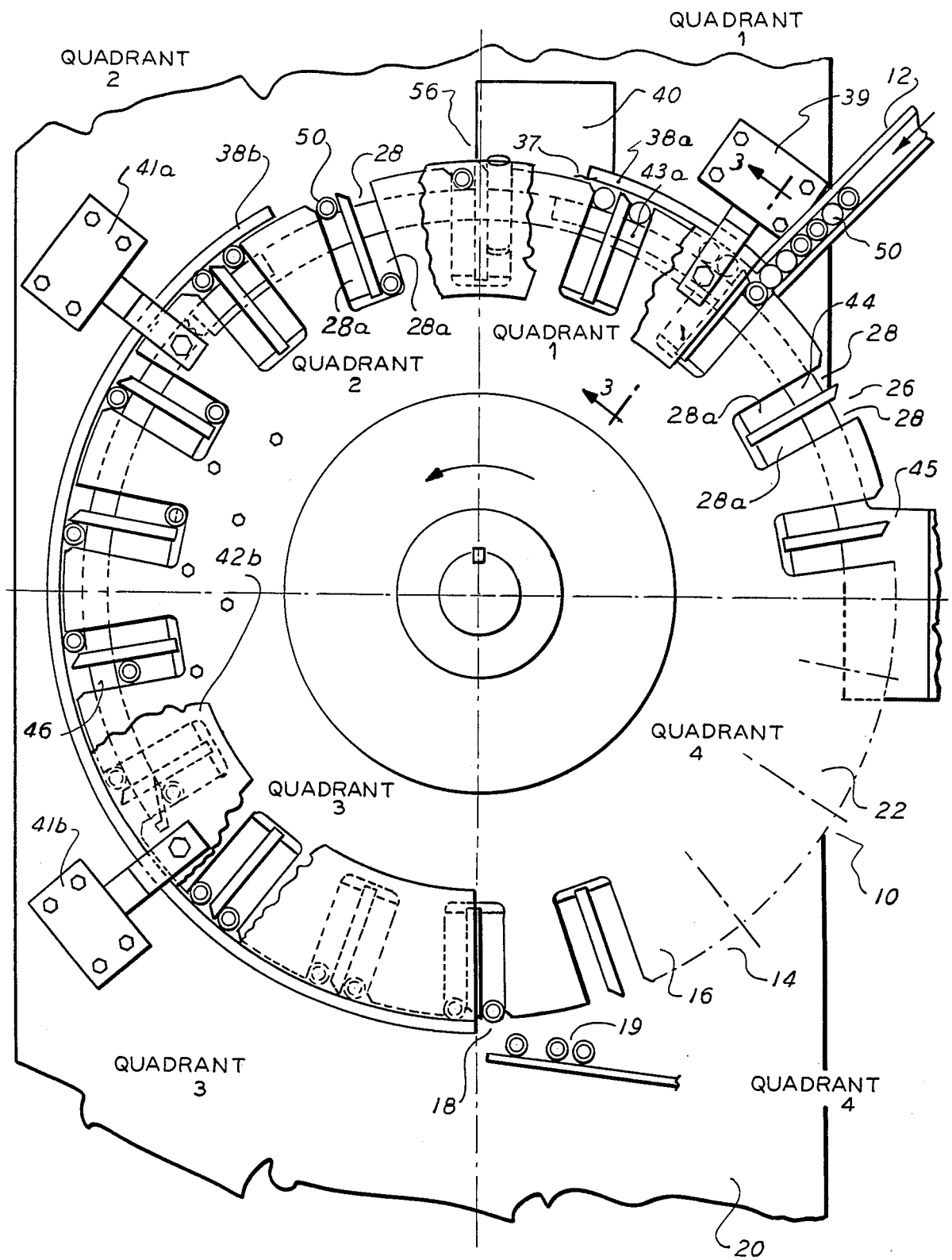
FIG. 1 is a side elevation view schematically part broken away illustrating apparatus in accordance with the present invention.
Figure 2:
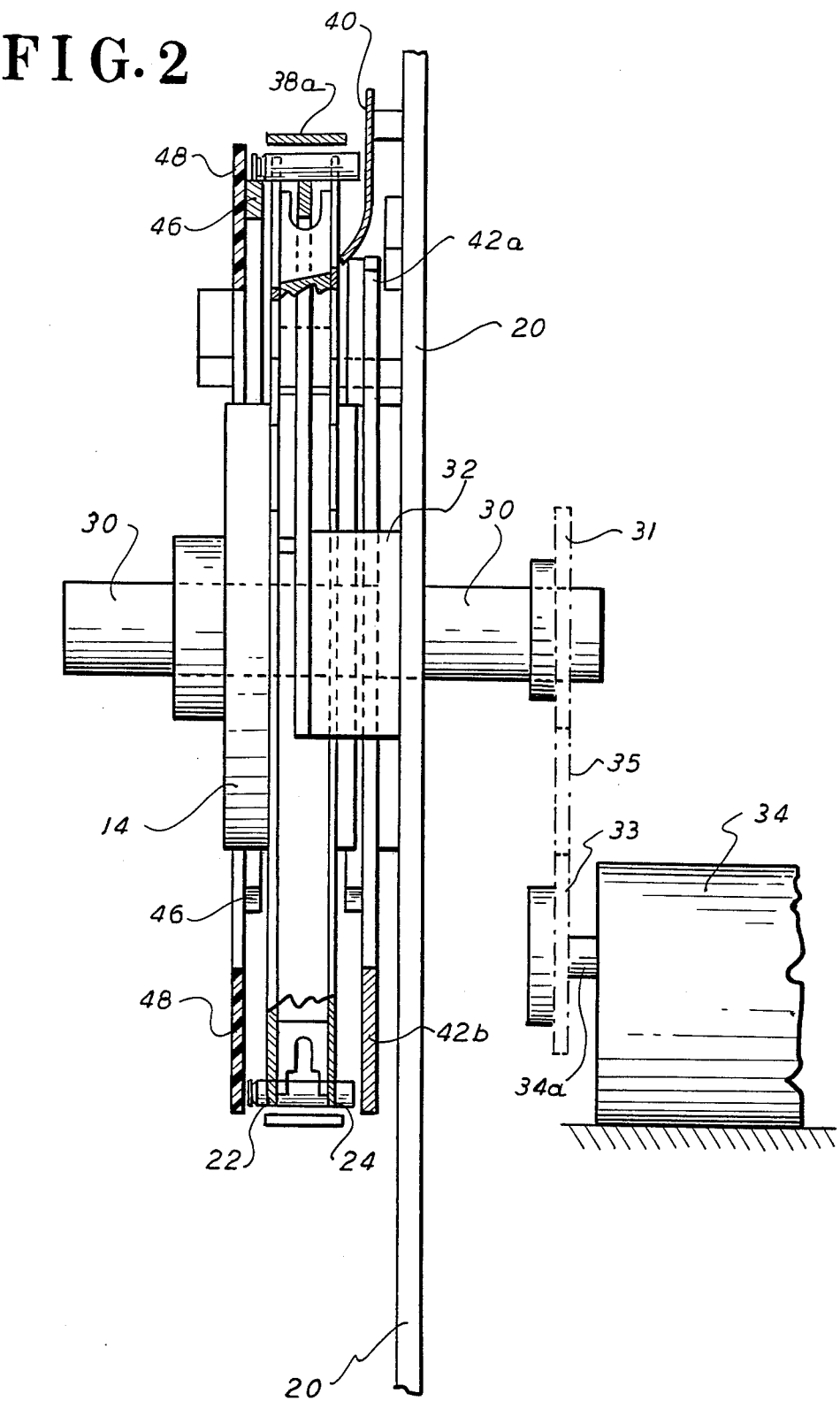
FIG. 2 is an end elevation view, part in section, of the apparatus of FIG. 1.
Figure 5:
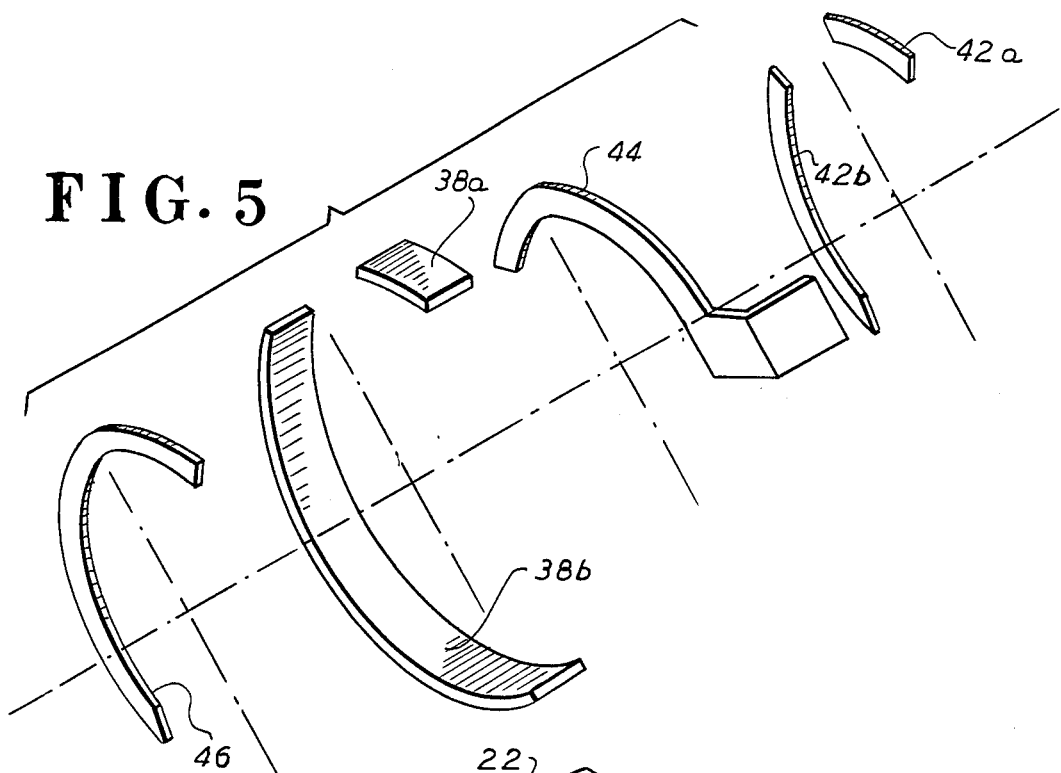
FIG. 5 is an enlarged view in perspective of the guide rails of the apparatus of FIG. 1 illustrating the relative relationship thereof.

Turning now to the drawing, wherein like reference numerals denote like parts, there is shown in FIG. 1 a side elevation schematic representation and in FIG. 2 an end elevation representation of a general assembly of an embodiment of the orientation apparatus that incorporates the essential features of the present invention.

Apparatus 10 in FIGS. 1 and 2 will be described especially for use in connection with orientation and feeding of articles, parts, or components 50 of the type seen in FIGS. 1 to 4C. These components 50 are characteristic of the type of articles with which the present apparatus is intended to be utilized. The articles 50 (FIGS. 3, 4A, 4B and 4C) are thus seen to include a tubular or cylindrical metal, plastic or the like shell portion 51 having a principal axis which is longer than the other axis (e.g. the diameter). It is generally open at one end 53 and closed at the other end 52, which may also be somewhat heavier than the open end 53. There is no intention to in any way be limited with respect to use of the apparatus of the invention with particular types of such articles 50; but for purpose of illustration, it can be pointed out that in many typical applications, articles 50 can comprise a cosmetic or pharmaceutical vial in which instance the portion 51 is actually a plastic cylinder having an open end 53 which, for example, may be provided with a neck of the same or smaller diameter and may have external threads; article 50 can comprise a cartridge shell casing in which instance the portion 51 is actually a metal tube which is open at one end 53 and has a closed end 52 which is heavier than the open end 53; or article 50 can comprise a metal, plastic and the like tube of rectangular, round, eliptical or other geometric cross-section, having one end that is different than the other.

It is reiterated, however, that numerous other articles have similar shape characteristics, and thus for purpose of FIGS. 1 and 2, it primarily is to be considered that a collection of articles with randomly arranged ends are intended for initial feed to the orienting wheel assembly 14 at feed chute 12 with the objective being to provide an output feed at 18 wherein the discharged articles are oriented in a common direction with the principal axis parallel and all the same ends oriented in one direction.

Figure 6:
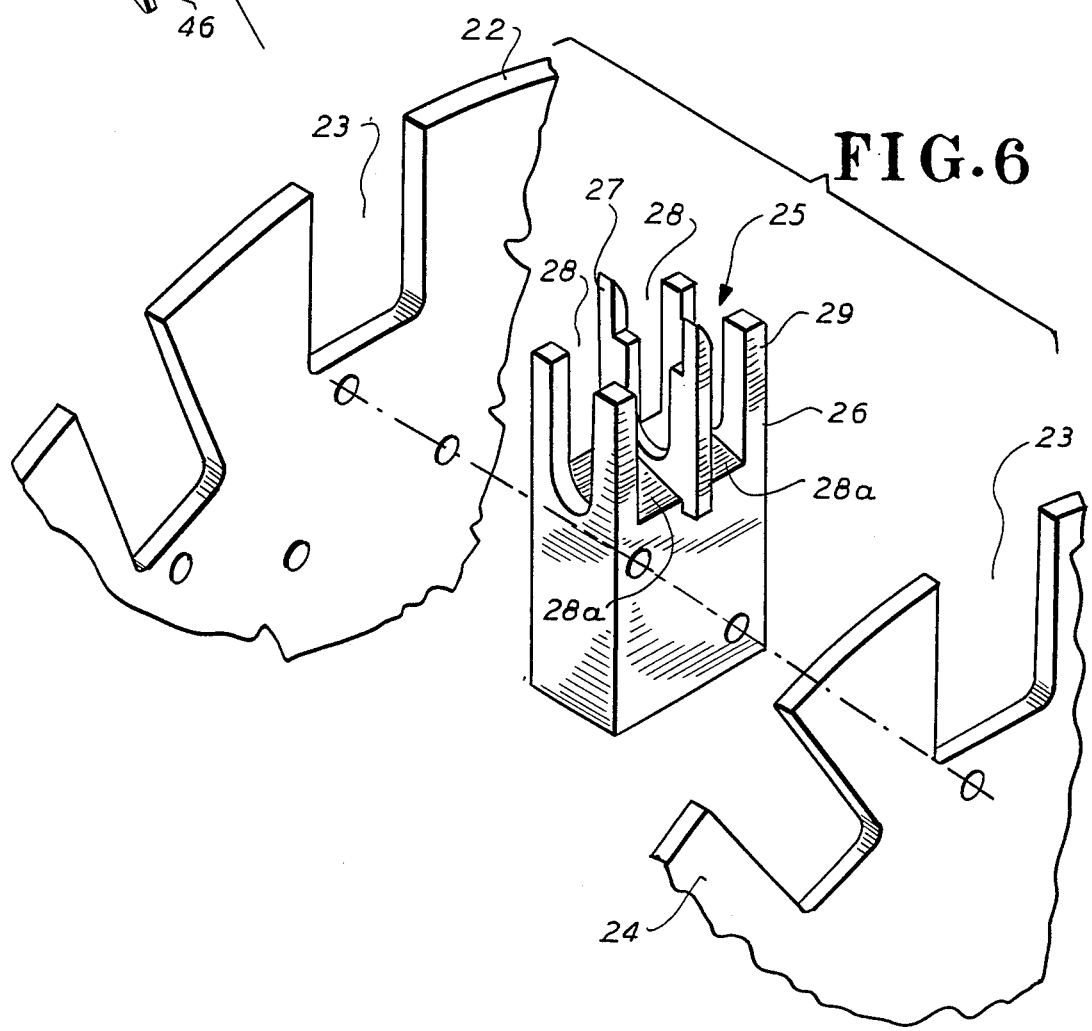
FIG. 6 is an enlarged, broken apart perspective view of the article pocket slots in the periphery of the apparatus of FIG. 1.

Apparatus 10 is seen to include a vertically disposed support panel on which is supported the orienting wheel assembly 14. Orienting wheel assembly 14 comprises a rotating wheel 16 which is oriented for rotation about one end of a horizontally disposed shaft 30 journaled through support panel 20 in bearings 32. The wheel 16 has front 22 and back side plates 24 (FIG. 6) between which are secured a plurality of article holders 26 having open ended pockets 28 with substantially parallel vertical side walls 29. The article holders 26 are secured between the front 22 and back side plates 24 with open ended pockets 28 in the holders 26 being aligned with and extending between cut-out segments 23 in the periphery of the front 22 and back side plates 24 to provide a plurality of outwardly opening pockets 28 that extend axially across the periphery of the rotating wheel 16. In the embodiment shown in the drawing, a divider 27 is vertically disposed in each of the article holders 26 intermediate the end walls 29 to form two open-ended pockets 28 for receiving articles in each holder 26. As would be evident, a plurality of said pockets 28 could, thus, be provided in the periphery of the rotating wheel 16 of the orienting wheel assembly 14. The number of such pockets 28 that is provided about the periphery of the wheel is not critical and can be varied widely, generally depending on the quantity and dimensions of the articles to be oriented and conveyed.

Mounted on the opposing end of shaft 30 (on opposite side of support panel 20) is a sprocket 31 which is coupled with a sprocket 33 on the end of motor shaft 34a of drive motor 34 by means of drive chain 35. Motor 34 is conveniently located adjacent support panel 20 and orienting wheel assembly 14.

The support wall 20 also supports a plurality of guides and guide rails which are positioned at appropriate stations along the path of rotation of the rotatable wheel 16. These include a guide ramp 40, a back side guide in two segments 42a and 42b, a back side guide rail in two segments 43a and 43b, a center guide rail 44, a front guide rail 46, a front side guide 48, and an outside guide rail in two segments 38a and 38b. All of said guides and guide rails are held stationary and are positioned relative to the rotating wheel 16 to guide and/or provide guide support for articles 50 disposed within pockets 28 in the periphery of the rotating wheel 16.

Turning now to a more specific description of the orienting wheel assembly 14 and with reference to FIGS. 3, 4A, 4B, 4C and 5, it will be noted that the pockets 28 in the periphery of the wheel 14 open outwardly and that the several guides and guide rails are disposed relative thereto to guide and/or support articles 50 within the pocket 28 as it passes through various quadrants of rotation of the wheel 16. Back guide segment 42a, back guide rail segment 43b, outside guide segment 38a, front guide rail 46 and front side guide 48 are mounted on a bracket 39 which is secured to support panel 20. Center guide rail 44 is mounted on a bracket 45 which is also secured to support panel 20. Bracket 39 is disposed in the first quadrant of rotation of the wheel 16 generally adjacent and coordinated with the location of article feed chute 12. Bracket 45 is secured to support panel 20 generally bridging quadrant 4 and 1 of rotation of the wheel 16 with center guide rail 44 being disposed and extending circumferentially within an outwardly opening recessed passage 25 in the top of holder 26 intermediate front 22 and back side plates 24. The top (guide) surface of center guide rail 44 is in horizontal alignment with the top (guide) surface of back guide rail segments 43a and 43b and front guide rail 46. The bottom of center guide rail 44 is spaced from the bottom of pocket 28 in holder 26 to provide a further pocket 28a in the lower tier of said holder 26.

Article guide ramp 40, which is secured to support panel 20, is located generally adjacent the top segment of the wheel 16 bridging quadrant 1 and quadrant 2 of rotation of said wheel 16 and extends horizontally between back guide segment 42a and back guide rail segment 43a and back guide segment 42b and back guide rail segment 43b. Outside guide segment 38a extends about a portion of the periphery of wheel 16 in quadrant 1 of the rotation thereof in coordinated relationship with the location of guide ramp 40, back guide rail segment 43a and back guide segment 42a.

Brackets 41a and 41b, which are secured to support panel 20, provide support for outside guide segment 38b, and further support for front guide rail 46 and front side guide 48. Outside guide segment 38b extends about a portion of the periphery of the wheel 16 in the second and third quadrants of rotation of the wheel 16.

In its general manner of operation, the apparatus 10 in FIGS. 1, 2, 3, 4A, 4B and 4C will be described especially for use in connection with orientation and feeding of articles or components 50 of the type which have one axis longer than the other (diameter) and one end different than the other as herein described. As indicated, the articles 50 of the type seen in the drawing are characteristic of a type of article, but not limited thereto, with which the present apparatus is intended to be utilized. The article 50, as thus seen, includes an elongated cylindrical portion 51 which is open at one end 53 and has a closed weighted end 52.

Prior to start up, the apparatus 10 is placed closely adjacent to and in alignment with the end of a conveyor or chute 12 or other feed means which feeds a plurality of articles with their principal axis parallel and generally transverse to the direction of feed. Chute 12 is disposed with the end thereof adjacent to the rotatable wheel 16 and the leading end of outside guide segment 38a in alignment with the axis of outwardly opening pockets 28 in the periphery of said wheel 16.

After proper alignment of the article feed chute 12 with the apparatus 10, operation of the apparatus is initiated by turning on motor 34 and turning on the article feed conveyor (not shown). By virtue of the continuing rotation of rotating wheel 16 and the various guides and guide rails herein described, the articles 50 are oriented to provide a high speed output stream 19 of said articles 50 at 18 wherein like ends of all the articles are commonly oriented.

In accordance with the mode of operation of the present apparatus, the articles 50 fed from chute 12 are deposited in pockets 28 (top tier of holder 26) of the rotating wheel 16 where they are supported at each end by back guide rail segment 43a and front guide rail 46, and in their center by the top (guide) surface of center guide rail 44 (FIG. 3). As the articles 50 in pockets 28 of the wheel 16 emerge from the end of quadrant 1 of rotation into the beginning of quadrant 2, they will reach a transition zone 56 where back guide rail segment 43a ends (FIG. 4A), which removes support for one end of article 50. Outside guide segment 38a also ends in the transition zone 56. At this zone 56, an article 50 which is oriented in the pocket 28 with its closed, weighted end 52 supported by front guide rail 46 will be in a stable supported condition by virtue of the front guide rail 46 and by center guide rail 44, whereas an article 50 which is oriented in the pocket 28 with its closed, weigted end 52, no longer supported by back guide rail segment 43a will be in an unstable gravitational condition even though still supported by center guide rail 44 and front guide rail 46 (FIG. 4A). This will permit the closed, weighted end 52 of article 50 to tip from the unstable condition in the direction of the closed, weighted end (FIG. 4B). It will be clear that even in the absence of any positive force application, by virtue of the removal of one end support (guide rail segment 43a) at the transition zone 56, articles having different ends will be permitted to fall in a desired direction.

It will also be clear that the preferential tipping action which occurs at the transition zone 56 is not limited to plastic or metal tubes or articles having an open end and a closed end or weighted end but will generally occur where objects having different ends including different diameters, sizes and the like are fed through the present apparatus. Such articles, as they enter zone 56 ride from a zone where both ends or both ends and the center are supported to a zone where support for one of the ends is ended or changed. The principal requirement for such action to occur is simply that such articles when supported at only one of their ends and their center or at only one end portion be in a condition of unstable equilibrium generated in consequence of the differences that exist between the two ends of the articles.

Pursuant to a further aspect of the present invention, it may be found desirable to utilize auxiliary biasing force means to augment the unstabilizing factor which is naturally introduced as aforementioned by, for example, differences in weight or center of gravity.

It may in this connection be noted that one reason why such auxiliary force can be advantageous arises from a tendency of the article—especially if the differences in weight between the different ends is not great and the wheel is rotating at relatively high speed—to ride on guide rail 44 for a considerable distance before the gravitationally induced unstabilizing factor can fully act. It would be evident that any number of means, depending on the particular configuration of articles, with the apparatus shown could be used to provide auxiliary biasing means. For example, a stationary member such as a leaf spring, a protruding finger, and the like (37), located at an appropriate edge of outside guide segment 38a or back guide segment 42a could provide an auxiliary biasing force.

Upon passing through transition zone 56, articles 50 which tip by virtue of the unstable condition (FIG. 4B) are guided by guide ramp 40 through a complete 180° end for end turn-around to final resting in a lower tier pocket 28a of article holder 26 (FIG. 4C). The end 52 of article 50 is now in the direction opposite its orientation when fed to upper tier pocket 28. The end 52 of article 50 in lower tier pocket 28a is now also oriented in the same directon as the ends 52 of articles 50 which were not subject to an unstable condition by virtue of the ending of back guide rail segment 43a. To avoid any interference with the reorientation of article 50, outside guide segment 38a also ends at the transition zone 56.

Upon the rotation of wheel 16 from the transition zone 56, it will be clear that all articles 50 are commonly oriented with their closed, weighted ends 52 facing the front end of the apparatus. Back guide segment 42b, back guide rail segment 43b, front guide rail 46, front guide 48 and center guide 44 guide the articles 50 in the upper tier pocket 28 to the output station 18. Back guide segment 42b and front guide 48 guide article 50 in the lower tier pocket 28a of article holder 26 to the output station 18.

Center guide 44 ends in quadrant 3 of rotation of wheel 16, permitting reoriented articles 50 in the lower tier pockets 28a of holders 26 to fall in concert with articles 50 in the upper tier pockets 28 against outer guide segment 38b for discharge at output station 18, where outer guide segment 38b ends.

In the embodiment illustrated in the FIGS., rotatable wheel 16 may be rotated at a speed up to 50 or more revolutions/min. In such event, it has been found that six hundred, or even more articles 50 can be processed per minute. It should be understood that the speed of rotation can be varied over a wide range, in general, being dependent on the size of the wheel, the number of pockets in the periphery thereof and the size and shape of the articles to be reoriented and fed. A unique and surprising feature of the apparatus of the invention is the fact that continuously operating apparatus rapidly, automatically and effectively feed in high-speed output articles that are commonly oriented.

While the present invention has been particularly described in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. Apparatus for accepting an initially presented population of articles of the type having one axis generally longer than the other and one end different than the other with random orientation of the ends, and providing a high-speed output stream, wherein the ends of all said articles are commonly oriented, said apparatus comprising:
   (a) a rotatable wheel means oriented for rotation about a horizontally disposed axis having means in the periphery thereof for accepting articles with the principal axis thereof oriented parallel, in a substantially horizontal plane and transverse to the direction of rotation of said wheel and with the ends thereof randomly oriented;
   (b) means arranged along the track of rotation of said wheel for constraining articles within the periphery thereof and permitting the advance of articles with their principal axis parallel in a desired andwise orientation and in a substantially horizontal plane from an article accepting zone to an output zone in the track of rotation for said wheel; and
   (c) means for turning end for end articles being in an undesired endwise orientation within the periphery of said wheel along the track of rotation of said wheel intermediate said article accepting station and said article output station.

2. Apparatus according to claim 1 wherein said means for accpeting articles in the periphery of said wheel includes outwardly opening holders in the periphery thereof having outwardly opening ends and closed bottom ends opposite said outwardly opening ends, and said means for constraining said articles includes support means for at least one end portion of said articles within said outwardly opening holders.

3. Apparatus according to claim 2 wherein said means for contraining said articles includes support means intermediate the end portions of articles within said outwardly opening holders, and spaced from the bottom ends of said holders.

4. Apparatus according to claim 3 wherein said means for turning articles in the periphery of said wheel comprises support means for each end of said articles at the article accepting zone and means for withdrawing the support for one end of said articles advancing along the track of rotation for said wheel.

5. Apparatus according to claim 4 wherein the means for turning articles includes guide means for an article turning end-for-end within the periphery of said wheel arranged along the track of rotation for said wheel intermediate the article accepting zone and the article output zone.

6. Apparatus according to claim 5 which includes auxiliary biasing means for turning said articles.

7. Apparatus according to claim 1 wherein said articles have an open end and a closed weighted end, and said turning means includes means for gravitational tipping of the closed weighted end of said article as the result of said closed weighted end being in an undesired endwise orientation.

8. Apparatus according to claim 1 wherein said articles have one end of different diameter or size than the other end and said turning means comprises means for gravitational tipping of one end of said article as the result of said end being in an undesired endwise orientation.

9. Apparatus according to claim 8 which includes auxiliary means for biasing one end of said article.

10. Apparatus for accepting an initially presented population of articles of the type having one axis generally longer than the other, and one open end and a closed weighted end which are randomly oriented, and providing a highspeed output stream, wherein the ends of all said articles are commonly oriented, said apparatus comprising:
    (a) a rotatable wheel means having means in the periphery thereof for accepting individual articles with the Principal axis thereof transverse to the direction of rotation of said wheel and in a horizontal plane.
    (b) means arranged along the track of rotation of said wheel for constraining said articles within the periphery thereof and for advancing articles having commonly oriented ends with their principal axis in a substantially horizontal plane and transverse to the direction of rotation of said wheel from an article accepting station to an output station for said wheel;
    (c) means for turning articles constrained within the periphery of said wheel end for end during the advance thereof from the article accepting station to the article output station of said wheel only as a result of an article being in an undesired endwise orientation, whereby the ends of all of said articles are commonly oriented at the article output station; and
    (d) means for driving said rotatable wheel.

11. Apparatus according to claim 10 wherein said article accepting means in the periphery of said wheel includes outwardly opening pockets having outwardly opening ends and closed bottom ends opposite said outwardly opening ends, and said article constraining means includes support means for the opposing ends of said articles and for a point intermediate said opposing ends from the article accepting station to about a transition zone along a portion of the track of rotation of said wheel.

12. Apparatus according to claim 11 wherein said turning means for an article in said pocket includes withdrawing only the support means for one end of said advancing articles at about the transition zone wherein gravitational forces actuate turning of said article end-for-end as the result of said article being in an undesired endwise orientation.

13. Apparatus according to claim 3 wherein said means for constraining said articles includes a guide means extending about the outside of a portion of the periphery of said wheel from the track of rotation of said wheel where all articles are commonly oriented to the output zone.

* * * * *